United States Patent
Dew et al.

(10) Patent No.: US 10,481,421 B2
(45) Date of Patent: Nov. 19, 2019

(54) MOUNTING RING FOR MAINTAINING OPTICAL DEVICE ALIGNMENT

(71) Applicant: Gooch & Housego PLC, Ilminster (GB)

(72) Inventors: Robert W. Dew, Lyndhurst, OH (US);
Carl D. Brunetta, Mentor, OH (US);
Thomas E. Stenger, Mentor, OH (US);
Gabe S. Nau, Thompson, OH (US);
Thomas C. Walker, University Heights, OH (US)

(73) Assignee: Gooch & Housego PLC, Ilminster (GB)

( * ) Notice: Subject to any disclaimer, the term of this patent is extended or adjusted under 35 U.S.C. 154(b) by 0 days.

(21) Appl. No.: 16/292,041

(22) Filed: Mar. 4, 2019

(65) Prior Publication Data

US 2019/0271863 A1    Sep. 5, 2019

Related U.S. Application Data

(60) Provisional application No. 62/637,686, filed on Mar. 2, 2018.

(51) Int. Cl.
*G02B 7/22* (2006.01)
*G02F 1/03* (2006.01)

(52) U.S. Cl.
CPC .................. *G02F 1/0305* (2013.01)

(58) Field of Classification Search
CPC ... G02B 7/00; G02B 7/02; G02B 7/40; G02B 7/04; G02B 7/0006; G02B 7/08; G02B 7/10; G02B 7/105; G02B 7/12; G02B 7/14; G02B 7/16; G02B 7/18; G02B 7/182; G02B 7/183; G02B 7/188; G02B 7/192; G02B 7/195; G02B 7/198; G02B 7/20;
(Continued)

(56) References Cited

U.S. PATENT DOCUMENTS

2006/0145321 A1    7/2006    Fisher
2016/0109683 A1    4/2016    Sato
(Continued)

FOREIGN PATENT DOCUMENTS

FR    2986336 A1    8/2013

*Primary Examiner* — William R Alexander
*Assistant Examiner* — Tamara Y. Washington
(74) *Attorney, Agent, or Firm* — Neil R. Jetter; Jetter & Associates, P.A.

(57) ABSTRACT

An optical mount includes a mount material in a closed geometry with an outer surface sized for matching internal dimensions of an outer housing, and an inner surface including spaced apart inward extending contacting features providing contact points that collectively define an inner opening sized for securing an optical device including a crystal within. At least one feature gap or a recessed portion is between the inward extending contacting features. Edge holders are adapted for receiving corners of the optical device can be the protrusion pair or inner notches. The outer surface includes at least one outer notch between the inward extending contacting features. The edge holders and outer notch(es) are for each acting as hinge points opening or pinching depending on a direction of force on the optical mount for responding with flexure when there is a dimensional change in the crystal, mount material, or the housing.

19 Claims, 9 Drawing Sheets

(58) Field of Classification Search
CPC ... G02B 7/22; G02B 7/24; G02B 7/28; G02B 7/30; G02B 7/32; G02B 7/34; G02B 7/36; G02B 7/38; G02B 23/16; G02B 21/34
USPC ....... 359/198.1, 221.2, 430, 477, 489.2, 611, 359/703, 831–837
See application file for complete search history.

(56) References Cited

U.S. PATENT DOCUMENTS

| | | | |
|---|---|---|---|
| 2018/0081145 A1* | 3/2018 | Mitani | G02B 7/09 |
| 2018/0224624 A1* | 8/2018 | Ichihashi | G02B 7/04 |
| 2018/0224631 A1* | 8/2018 | Ichihashi | G02B 7/08 |
| 2019/0187340 A1* | 6/2019 | Jheng | G02B 5/003 |
| 2019/0208128 A1* | 7/2019 | Park | H04N 5/23287 |

* cited by examiner

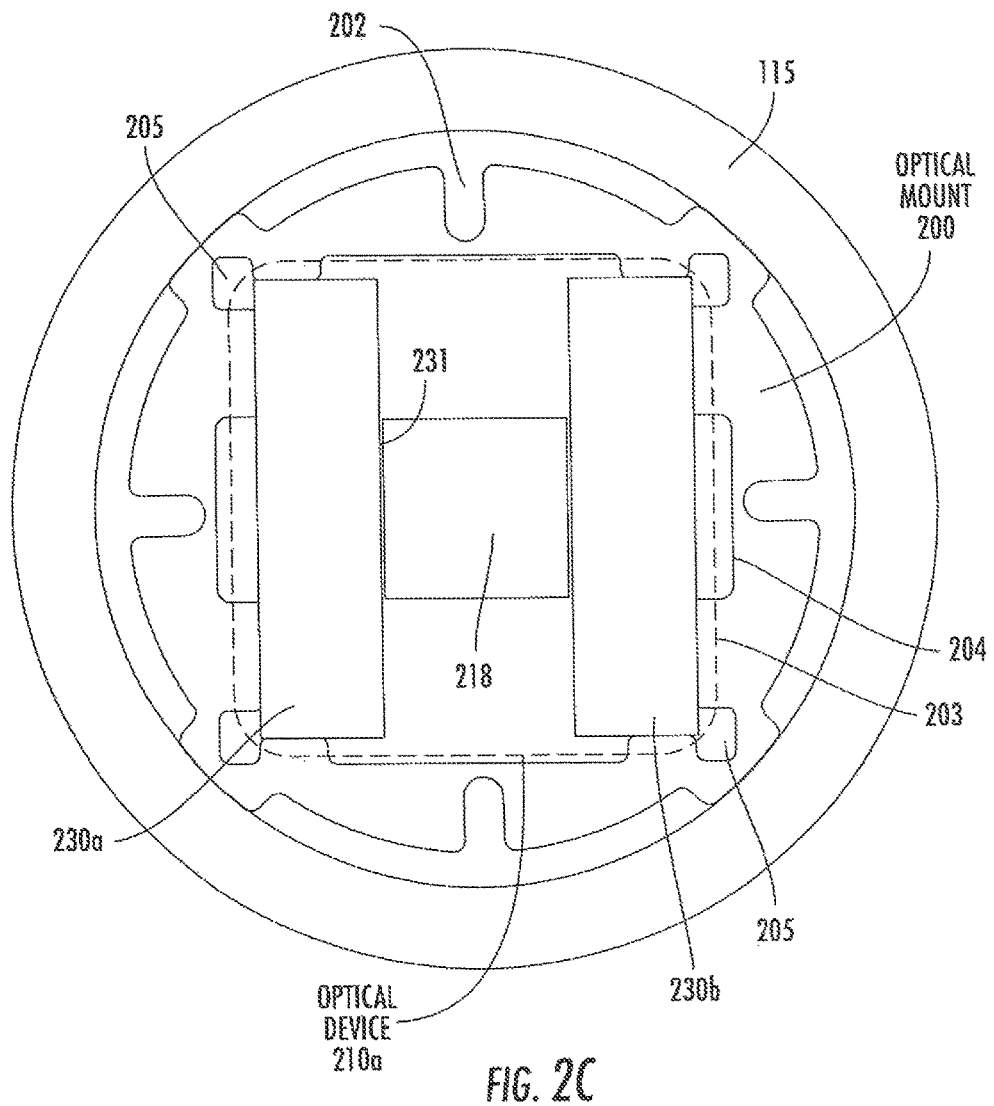

MOUNTING RING FOR MAINTAINING OPTICAL DEVICE ALIGNMENT

CROSS REFERENCE TO RELATED APPLICATIONS

This application claims the benefit of Provisional Application Ser. No. 62/637,686 entitled "MOUNTING RING FOR MAINTAINING OPTICAL DEVICE ALIGNMENT", filed on Mar. 2, 2018, which is herein incorporated by reference in its entirety.

FIELD

Disclosed embodiments relate to optical assemblies, and more particularly to optical mounts for maintaining the position of an optical device within a housing in an as-assembled predetermined effective operating position relative to a light beam.

BACKGROUND

Optical mounts are used to mount and to position both passive and active optical devices. A common challenge for mounting optical devices is ensuring that the optically active material (e.g., a crystal) is centered within the optical device and the beamline for effective implementation. The optical material is physically contacted and held in a position for the most effective implementation while trying to impart as little strain as possible on the optical material.

The optical mount needs to be rigid enough to ensure alignment is maintained throughout shipping, handling, and other shocks/vibrations that the optical device may experience under normal operation. Furthermore, the device capture provided by the optical mount needs to be compliant enough to allow the optical material some room for expansion or contraction in order to account for thermal effects to the optical material and the other housing components. Conventional solutions to this optical mount problem include cut-outs or pads made from compliant materials such as rubber, compliant surfaces such as spring-loaded flats, bonding using elastomeric adhesives, and clamping onto the optical material.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize the main shortcoming of the above-described conventional optical mounts is that the user generally needs to tradeoff one or more of (i) the level of strain imparted to the optical device by the optical mount, (ii) the rigidity of the mount, and (iii) the compensation for thermally expanding or contracting of the optical device material(s). It is believed to not be possible to address all three of these optical mount design issues using any known optical mount solution. The mounting approach of using cut-outs or pads made from compliant materials such as silicone rubber can produce a capture and centration for the optical material (which is generally a crystal) that inherently imparts little strain and can withstand shipping and handling. However, this approach is often poor at handling temperature excursions because such compliant materials (e.g., silicone rubber) are known to 'wet and stick' to surfaces of the optical material, therefore not allowing for expansion in sheer directions. Traditional springs and spring-loaded flats do not have the wetting and sticking problem unless used in conjunction with pads, but do have trouble balancing for providing enough force to retain the optical material, and not too much force which can to impair performance. These types of optical mounts also usually do not cope well with shipping and handling resulting in beam misalignment.

The known use of elastomeric adhesives as a pottant for mounting optical devices generally represents the most robust known approach to these optical mount design issues, and in certain cases can largely address all of these issues. However, the expansion properties of the elastomeric adhesive needs to essentially be perfectly matched to that of the optical material or the difference in the respective thermal expansion coefficients will impart strain to the optical material. Also, the use of pottants requires fixtures to hold the respective components in place while the adhesive cures, and also generally requires long assembly time while the curing is taking effect.

Disclosed optical mounts conform to the optical device on it's inside surface and to its outer housing on its outside surface. The optical mount includes a mount material in a closed geometry with an outer surface sized for matching the internal dimensions of the housing, and an inner surface including spaced apart inward extending contacting features providing contact points that collectively define an inner opening sized for securing an optical device that includes a crystal within. There is also at least one feature gap or a recessed portion between the inward extending contacting features. Edge holders are adapted for receiving corners of the optical device comprise a protrusion pair or inner cut-out regions referred to herein as 'inner notches'. The outer surface includes at least one outer notch between the inward extending contacting features. The edge holders and outer notch(es) both are for acting as hinge points opening or pinching depending on a direction of force on the optical mount for responding with flexure when there is a dimensional change in the crystal, the mount material, or the housing.

Disclosed optical mounts thus create a system of opposing hinge joints that absorb flexing or dimensional changes in the component(s) of the optical device due to forces such as thermal expansion while minimizing the strain on the optical device. Disclosed gaps and/or notches thus enable the mount material in between the optical device and the housing to have flexural properties which emulate the durometric properties of a rubber or silicon, while eliminating the sticky surface of known elastomers that can cause strain to the optical device's crystal assembly upon heating or cooling.

BRIEF DESCRIPTION OF THE DRAWINGS

Reference will now be made to the accompanying drawings, which are not necessarily drawn to scale, wherein:

FIG. 2C is a view of the optical mount shown in FIG. 2A having an composite optical device now shown having two metal plates with and a conductive epoxy to make a sandwich with a crystal inside, and a housing outside, according to an example embodiment.

DETAILED DESCRIPTION

Figure 1A:
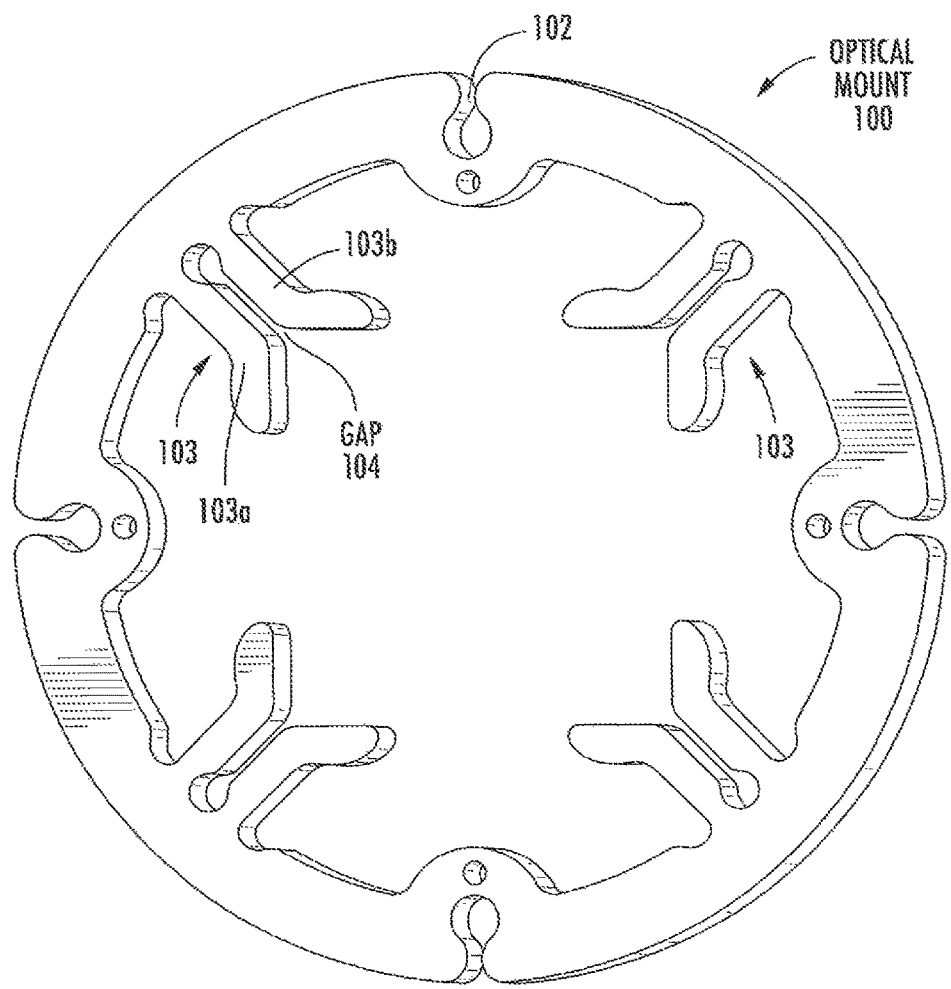
FIG. 1A is a top perspective view of an example optical mount having edge holders adapted for receiving corners of the optical device comprising a protrusion pair including adjacent protrusions with a feature gap in between the protrusions in the protrusion pair, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this Disclosure.

FIG. 1A is a top perspective view of an example optical mount 100 having edge holders adapted for receiving corners of the optical device comprising a protrusion pair 103 comprising adjacent protrusions 103a, 103b with a feature gap 104 in between the adjacent protrusions, according to an example embodiment. Between the protrusion pairs 103 on the outer surface of the optical mount 100 there is shown a plurality of outer notches 102.

The optical mount 100 can generally be made in any shape to match the optical device and be molded or cut-out to provide its respective features. The optical mount 100 comprises a mount material having a thickness that is generally approximately 2 mm, such as being 1 to 5 mm thick. The mount material can comprise a plastic, various elastomers, or a metal, depending on the application. For example, the mount material can comprise an elastic polymer, such as comprising a polyaryletherketone (PAEK) which is the name for the family of thermoplastic polyketone compounds including PEK, polyether ether ketone (PEEK, a name branded by ICI under the VICTREX tradename), PEKK, and PEKEKK among others. PEEK generally has a 25° C. Young's modulus of 3.76 to 3.95 GPa. The Young's modulus (or the Modulus of Elasticity) as known in physics is a measure of stiffness of an elastic material, where elasticity is a fundamental property of materials. The plastic material selected for the optical mount may be low outgassing by having a low vapor pressure to avoid affecting performance of the optical device, such by selecting PEEK.

As used herein, an 'elastic material' has an elasticity at 25° C. of 0.1 to 10 GPa, generally being 1 to 10 GPa which includes PEEK. Elasticity of the mount material may not be required as the outer notches 102 and/or inner notches 205 shown in FIG. 2A described below themselves sometimes alone can create a sufficient hinge action and spring force.

The outer notches 102 and the protrusions 103a, 103b of the protrusion pairs 103 enable the optical mount 100 to generate a sufficient restoring spring force when stretched in its configuration, and in general comprises a composition that will not produce a 'wetting' that can adhere to the optical device surfaces. As noted above, conventional compliant mount materials such as rubbers can conform to a device surface and 'wet', where this process forms weak bonds from the rubber material to the device surface in the form of dispersion forces (van derWaals bonding). This wetting property is recognized herein to adhere to the surface of the optical device, which can create an undesirable source of strain to the device. Such conventional mount materials such as rubbers can also cause outgassing that can contaminate the crystal of the optical device.

The mount material can also take into consideration the coefficient of thermal expansion (CTE) of the optical device and the CTE of the housing material so that it can compensate for any CTE mismatch. The CTE of the crystal for the optical device is generally <CTE of material of the optical mount < CTE of the housing. The CTE of crystals are typically between 0 and 20 ppm, metals when used for the optical mount have typical CTEs between 15 and 40 ppm, while housing materials when comprising a plastic generally have CTEs between 10 and 200 ppm. In the application of a pockels cell, for example, a metal mount material is not suitable due to its electrical conductivity. However metals can be viable mount materials for non-electro-optic devices such as waveplates, polarizers, and harmonic generators.

Figure 1B:
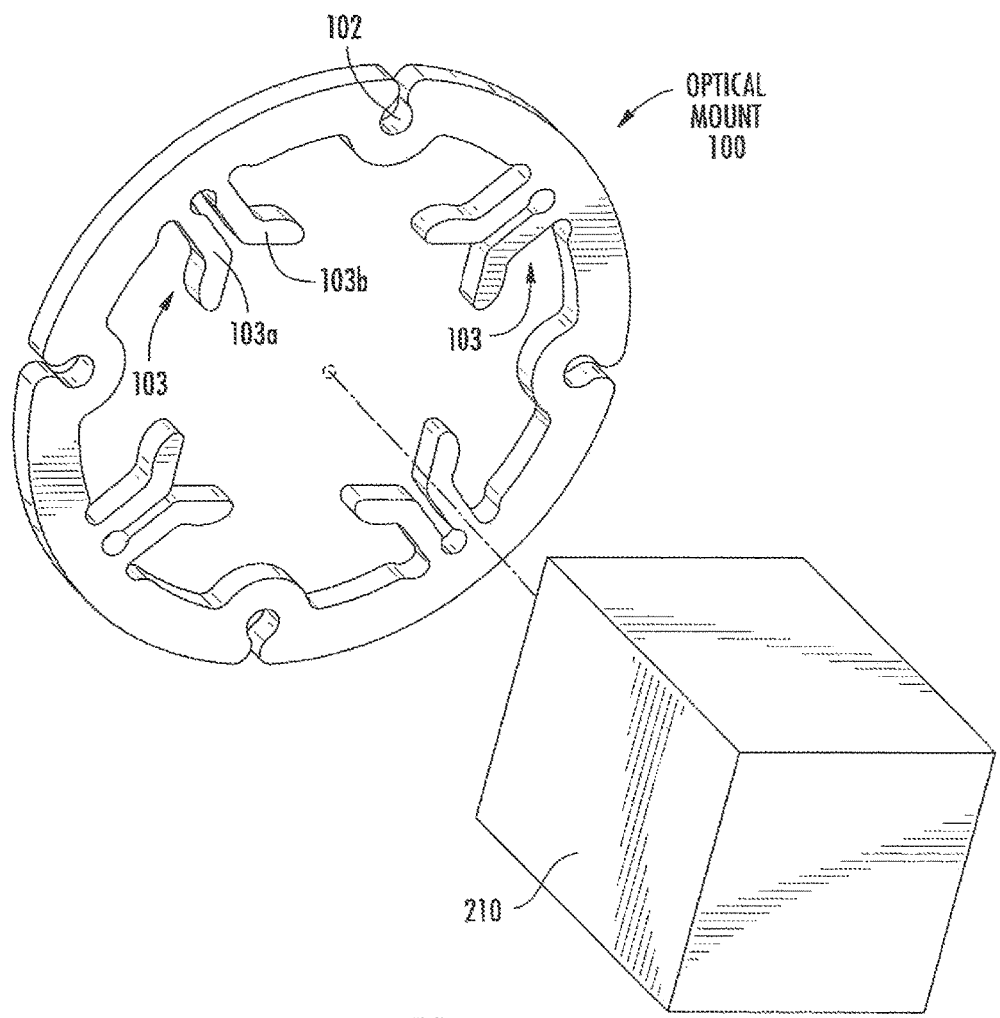
FIG. 1B is a view of an example optical mount in FIG. 1A before placement of the optical device within the optical mount, according to an example embodiment.

FIG. 1B is a view of the optical mount 100 in FIG. 1A before placement of the optical device shown as 210 that includes a crystal within the optical mount 100. The placement can be performed by machine or by hand. The size of the opening for receiving the optical device defined by the spacing between oppositely facing ones of the protrusion pairs 103 is generally barely smaller than the optical device, such as by about 0.005 inches (0.127 mm) so that at room temperature the optical device can slide through the opening in contact with the optical mount but with minimal resistance. There can be a tradeoff of firmness of grip of the optical mount 100 which avoids slipping of the optical device 210 during operation but may put more strain on crystal to enter the optical mount 100. The tradeoff is that as the grip is tightened on the optical material there is a higher amount of strain on the optical material which can impede the performance of the optical device 210. Also, the tightness of the optical mount 100 may create more surface friction and prevents the optical material from being able to slide through the optical mount 100 as it expands or contracts in the z-direction during temperature cycling. This adds sheer strain to the optical material which decreases performance of the optical device 210 and potentially could fracture the optical material.

Once the optical device 210 is within the optical mount 100, the protrusion pairs 103 of the optical mount 100 apply a continuous inward spring restoring force that secures a position of the optical device 210 with respect to the optical mount 100. This disclosed feature helps maintain the centering of the crystal of the optical device 210 once the optical mount with the optical device therein is assembled in the housing. The crystal position of the optical device 210 is maintained so that the crystal axis essentially does not move with respect to the housing (outside cylinder surface which is the mounting reference) during transport, or when heated or cooled. The optical mount 100 also minimizes strains on the crystal that would be generated if the crystal were conventionally glued or clamped to a surface of a material with a different CTE.

Figure 1C:
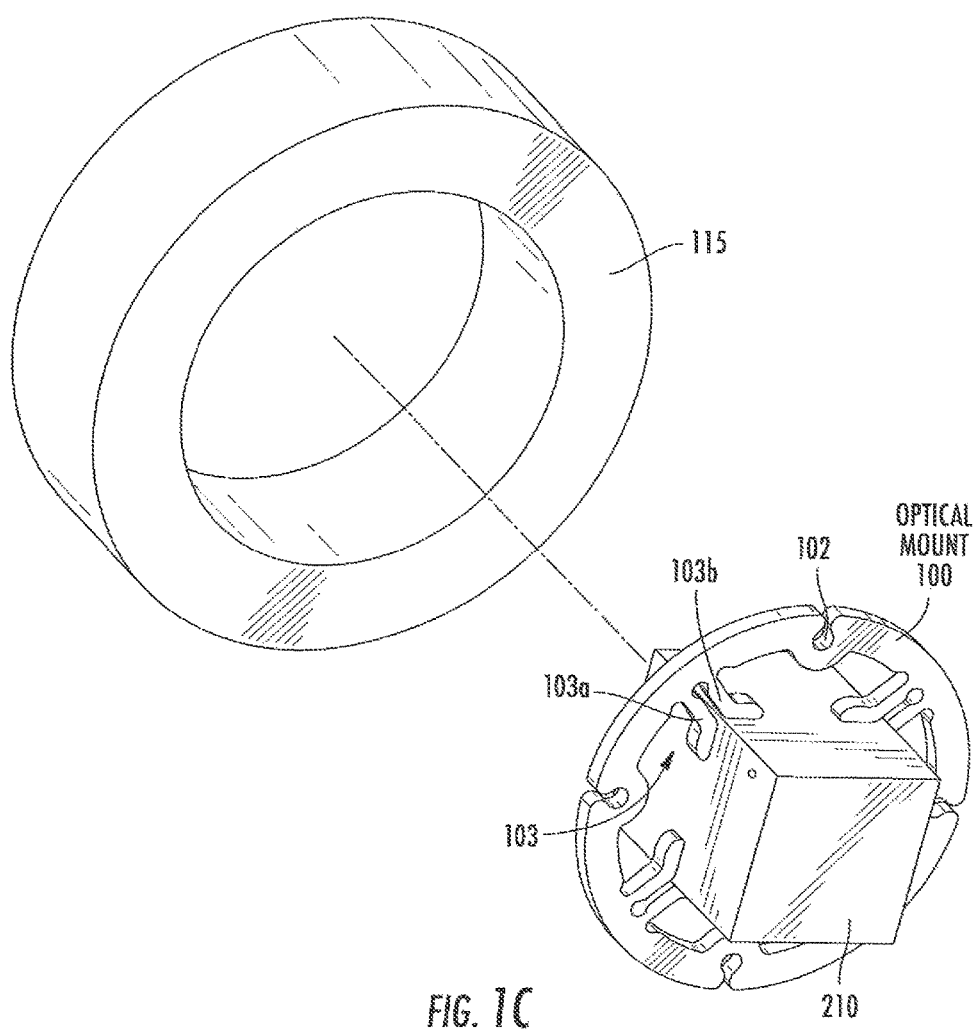
FIG. 1C is a view an optical device within the disclosed optical mount in FIG. 1A before placement in the housing shown, according to an example embodiment.
Figure 1D:
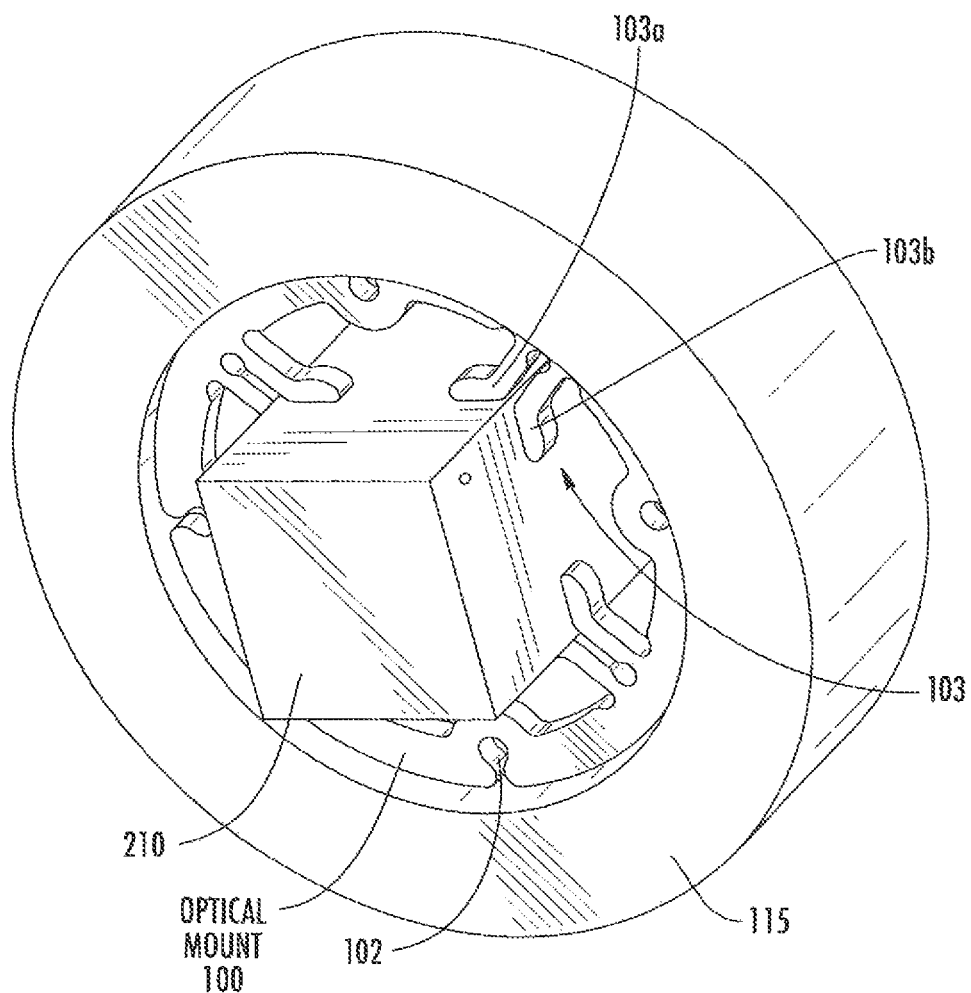
FIG. 1D is a view an optical device within the disclosed optical mount in FIG. 1A after placement in the housing.

Although a crystal can be directly held, generally the optical device 210 is a composite structure, such as having two metal plates with a conductive epoxy making a sandwich with the crystal in-between such as shown in FIG. 2C described below. FIG. 1C is a view an optical device 210 within the optical mount 100 in FIG. 1A before placement in the housing 115. FIG. 1D is a view an optical device 210 within a disclosed optical mount 100 in FIG. 1A after placement within the housing 115.

Viewing the optical mount 100 one can recognize how the optical mount can be slipped over an optical device 210 including a crystal. If the distance between the opposite facing ones of the protrusion pairs 103 is a bit smaller than the height of the optical device 210, the optical device 210 once inside the optical mount 200 is securely held within by the protrusion pairs 103.

Figure 1E:
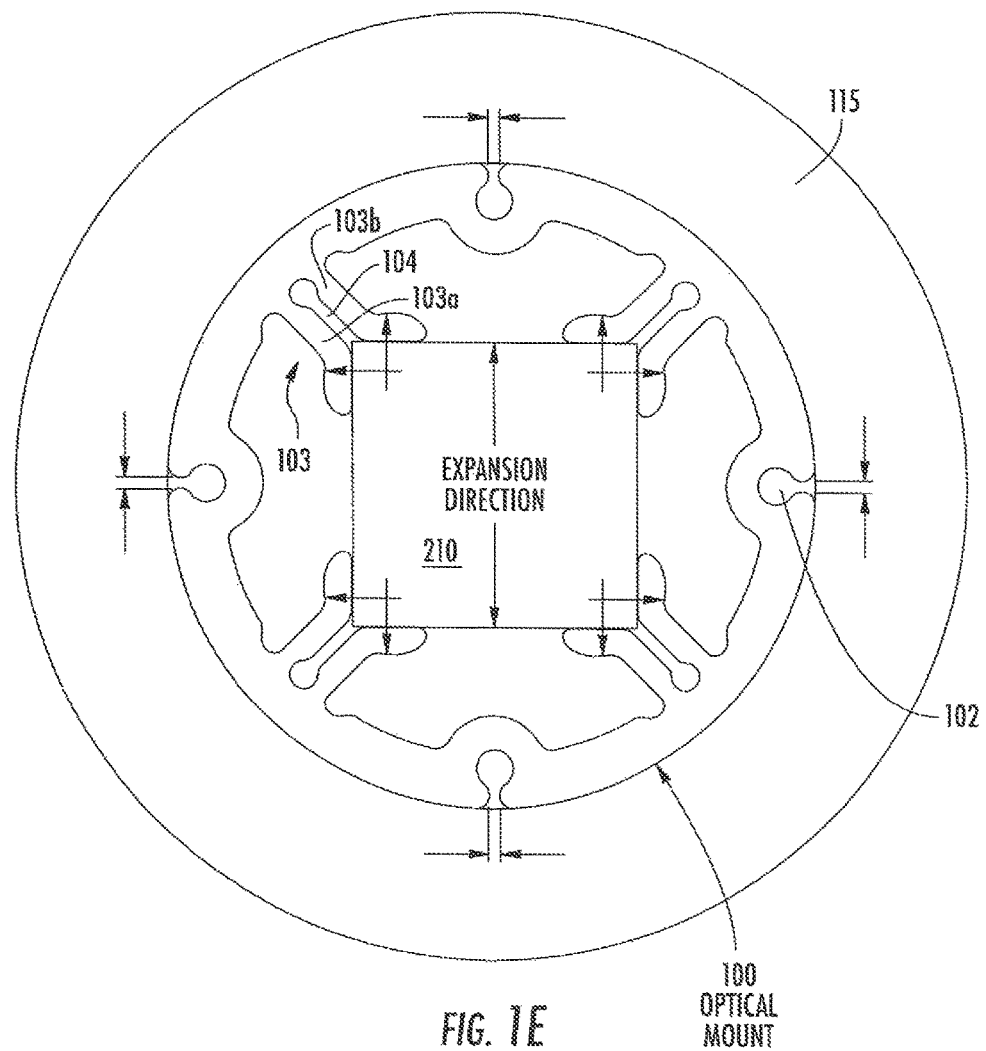
FIG. 1E is a view of the optical device within the disclosed optical mount in FIG. 1A in the housing providing an expansion example (e.g., due to increased temperature) in one direction (shown as the y-direction), with arrows shown indicating the reactions of the protrusion pairs and the outer notches to the expansion, according to an example embodiment.

FIG. 1E is a view of the optical device 210 within the optical mount 100 in FIG. 1A within the housing 115 providing an expansion example (e.g., due to increased temperature) in one direction (shown as the y-direction) with arrows shown indicating the reactions of the protrusions 103a, 103b of the protrusion pairs 103 and outer notches 102 to the expansion. As a range of operation, it is estimated that the optical mount 100 will generally accommodate a mismatch of at least approximately 200 ppm CTE over about 10° C.

It is believed that the mount material between the respective outer notches 102 and protrusion pairs 103 (or inner notches 205 in FIG. 2A) referred to herein as 'bridges' flexes (i.e., bends) responsive to the applied forces. Making these bridges between the notches 102, and protrusion pairs 103 (or inner notches 205 in FIG. 2A) either longer or narrower will tend to reduce the amount of force needed to bend the bridges. The displacement of these bridges to accommodate the changing dimension of the crystal of the optical device 210 for example is known to be proportional to the force divided by Young's modulus, but goes with the cube ($3^{rd}$) power of the ratio of width to length. So in practice the mount material selected may be an elastic material, and the width (or length if there is space to do so) of the bridges may be adjusted appropriately to obtain a proper balance between not clamping down on the crystal to induce significant strain, and not being too loose so that inertial forces (when the assembly is moved) will deflect the crystal significantly.

Although the angle between the distal ends of the protrusions 103a, 103b is shown herein as being 90 degrees, the angle between the distal ends of the protrusions 103a, 103b is more generally typically 80 to 100 degrees. An angle less than 90 degrees may be helpful because it keeps points of contact with the optical device 210 in the same place and away from the corners (that may have bevels be irregular) even when the crystal of the optical device 210 is expanding and the angle increases accordingly.

Moreover, although the optical device 210 is shown being rectangular-shaped, the optical device 210 can be shaped other than rectangular provided the mounted optical device is of prismatic shape with planar sides intersecting at the corners of the optical device 210. Other example optical device 210 cross-sections with 4 faces other than square and rectangle include trapezoidal, rhombus or even irregular quadrangles. The optical device 210 may also have more than 4 corners, such as having a hexagon or an octagon shape. One reason for deviating from a rectangular shape may be to maximize the aperture for a given housing diameter. This can be of interest for example in a telescope where light collection is maximized while the cost goes up with the size of the tube. If one has an optical device having more than 4 corners, it is possible not all corners would need to be contacted by protrusion pairs 103. A hexagon shape for example may use with 3 protrusion pairs 103, and an octagon shape with 4 protrusion pairs 103. Accordingly, depending on the shape of the cross-section of the optical device, the angle between two adjacent prism faces may be 90 degrees or something else such as 120 degrees for a hexagon, and 135 degrees for an octagon.

Figure 2A:
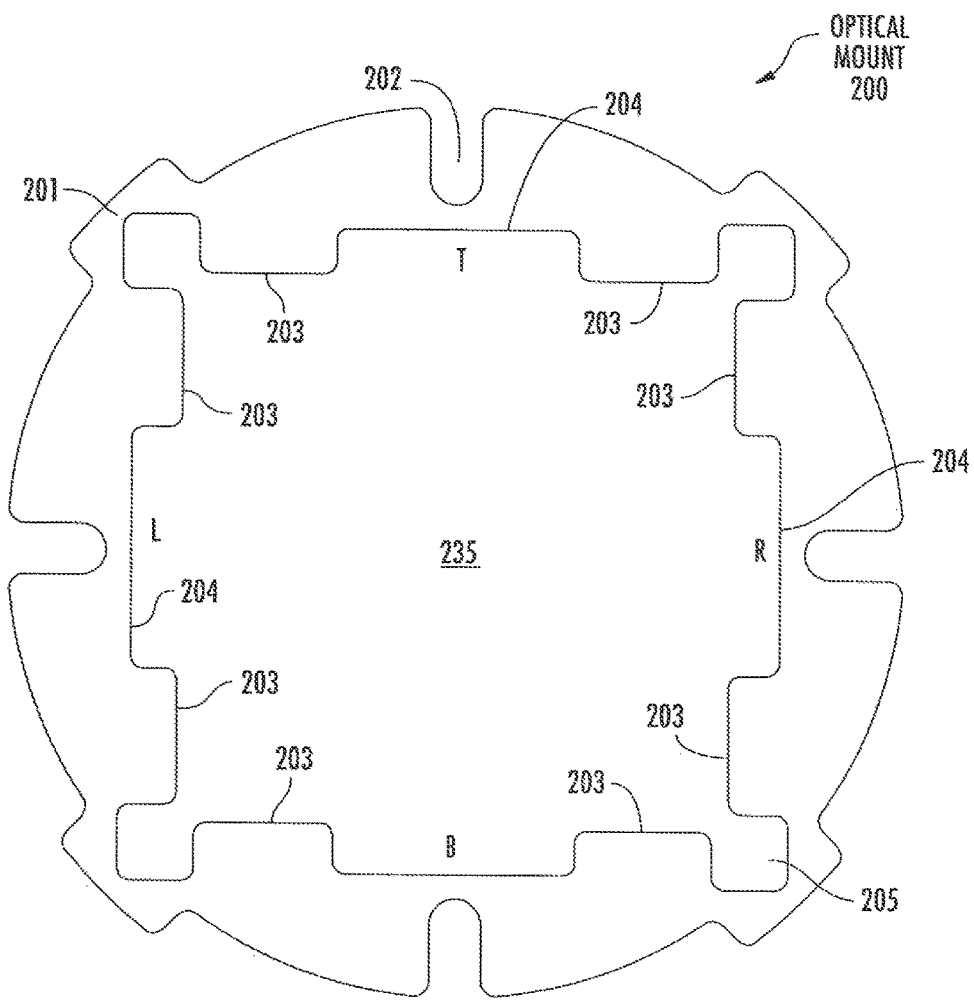
FIG. 2A is a top view of another example optical mount having edge holders adapted for receiving corners of the optical device comprising inner notches, according to an example embodiment.

FIG. 2A is a top view of an example optical mount 200, according to an example embodiment. The optical mount 200 comprises a mount material shaped in a closed geometry with a hollow center 235, with the optical mount 200 shown being ring-shaped wherein the wherein the inner protrusions 203 along the inner surfaces define a rectangle. The optical mount 200 has along its circumference alternating internal notches 202 and external notches 205 that as described above provide a system of hinge joints. The notches 202, 205 can be seen to be alternating with one another and all being equally spaced from one another being 45 degrees from one another as shown in FIG. 2A.

The optical mount 200 has an outer surface with outer protrusions 201 sized for matching the internal dimensions of an outer housing 115 and outer notches 202 between the outer protrusions 201 and over the recessed portions 204 for adding flexing when stretched or compressed, and an inner surface. The inner surface includes a plurality of inner side walls shown by example having 4 walls shown as a top (T), bottom (B), left (L) and right (R) side wall in FIG. 2A. However, the hollow center 235 can generally be any shape based on the object being centered in a body. Although a square or cylinder optical device is common, other geometric shapes of the hollow center 235 for other applications such as prism applications can comprise a triangle or a trapezoid.

There are generally at last two walls along each plane of the crystal of the optical device 210 that is inserted. So for a trigonal crystal, there would be at least 6 walls (i.e. the protrusions touching the crystal, no matter what orientation), for a rectangular crystal (square being a special case), there would be least 8 as shown. These crystal walls are generally placed carefully with relationship to the inner notches 205 and the flexures over the outer notches 202.

The outer notches 202 being over the recessed portions 204 provide added flexure for the optical mount 200. The thickness of the mount material at the notches 202, 205 should generally be equal and placed evenly around the optical device 210 to balance each other and create a buffering effect for dimensional changes or vibrations experienced by either the housing or the optical material. The protrusions 201 and 203 act as the interface to the housing and the optical material, respectively.

In FIG. 2A each inner side wall has 2 inner protrusions 203. The inner protrusions 203 are sized to come in contact with the optical device are in general extend out about a quarter (15 to 35%) of the width of the optical device 210. A minimum thickness of the inner protrusions 203 is generally at least 30% greater than a maximum thickness of the recessed portions 204 over the outer notches 202. The recessed portions 204 being equal in length to the recessed portion 204 is for creating an equal spring force between the notches 202, 205.

As with the optical mount 100 as described above, the optical mount 200 can generally be made in any shape to match the optical device and be molded or cut-out to provide the notches 202, 205. The notches 202, 205 are seen to alternate internal to external of the optical mount 200 and are evenly spaced around the circumference of the optical mount 200. The optical mount 200 makes contact evenly mainly due to the even spacing of the opposing notches 202, 205, and applies an equal force that is generally as low as possible to simulate a floating crystal centered in a housing. The force can generally be made to be any value through the tolerancing of the notch 202, 205 dimensions in comparison to the optical device 210 being centered.

Figure 2B:
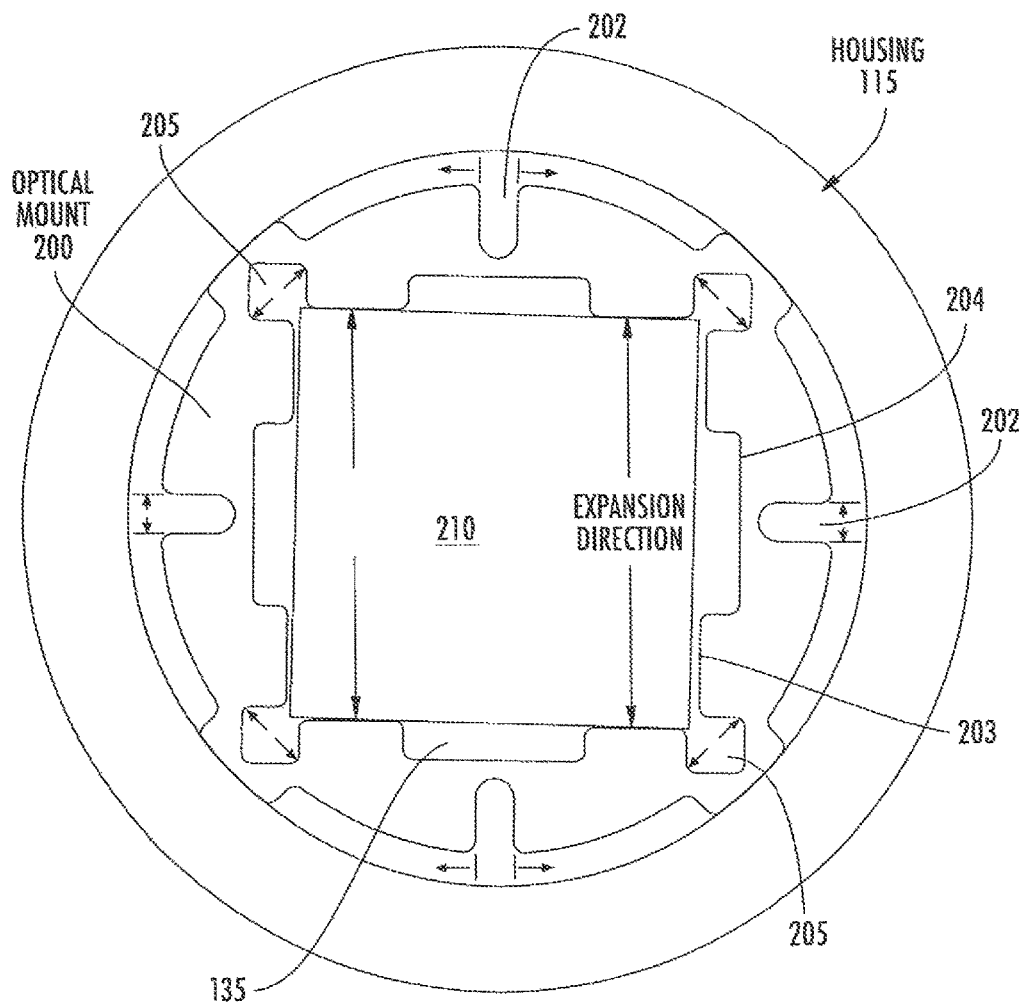
FIG. 2B is a view of the optical mount shown in FIG. 2A having an optical device inside and a housing outside, providing an expansion example (e.g., due to increased temperature) in one direction (shown as the y-direction) with arrows indicating the reactions of the inner notches and outer notches to the expansion, according to an example embodiment.

FIG. 2B is a view of the optical mount 200 shown in FIG. 2A having an optical device 210 inside and a housing 115 outside, providing an expansion example (e.g., due to increased temperature) in one direction (shown as the y-direction) with arrows indicating the reactions of the inner notches 205 and outer notches 202 to the expansion, according to an example embodiment. This FIG. represents flexing of the optical mount 200. The 'bridges' between the notches 202, 205 act as hinge points and the notches either open or pinch depending on the direction of the force applied by optical device 210 to the optical mount 200. As a range of operation, as with the optical mount 100 described above it is estimated that the optical mount 200 will generally accommodate a mismatch of approximately 200 ppm CTE over about 10° C.

FIG. 2C is a view of the optical mount shown in FIG. 2A having a composite optical device 210a now shown having two metal plates 230a, 230b with and a conductive epoxy 231 to make a sandwich with a crystal 218 inside, and a housing 115 outside, according to an example embodiment. The metal plates 230a and 230b function as electrodes, with an adhesive 231 such as a conductive epoxy to make a sandwich with the crystal 218 inside. In this arrangement the held body of the optical device is still held close to the corners, but it is the corners of the metal plates 230a, 230b being directly held rather than the crystal 218. The optical mount 200 for the composite optical device 210a still minimizes the pressure on the crystal 218 of the optical device 210a because the forces acting to hold the sandwich will directly be relayed to the crystal 218.

The size of the hollow center 235 is generally barely smaller than the optical device generally, such as by about 0.005 inches (0.127 mm) so that at room temperature the optical device can slide through the opening in contact with the optical mount but with minimal resistance. Once the optical device 210a is within the optical mount 200, the optical mount applies a continuous inward spring restoring force oriented inwards towards the center of the hollow center 235 that secures a position of the optical device 210a with respect to the optical mount 200. This feature helps maintain the centering of the crystal of the optical device 210a once the optical mount with the optical device therein is assembled in the housing. The crystal 218 position of the optical device 210a is maintained so that the crystal axis essentially does not move with respect to the housing (outside cylinder surface which is the mounting reference) during transport, or when heated or cooled. The optical mount 200 also minimizes strains on the crystal that would be generated if the optical crystal were glued or clamped to a surface of a material with a different thermal expansion coefficient.

To fabricate the optical mount 100 or 200, a single solid structural body consisting of a single piece of mount material can be cut-out or molded (e.g., injection molded) to provide its outer dimensions and a shape substantially matching the internal dimensions of the housing and its inner dimensions and shape defining a hollow center 235, or having protrusion pairs 103, for the optical device 210 or 210a to fit into and receive an inward pointing spring restoring force. Feature gaps 104 may be formed using material removal methods, such as described below. Other features on the optical mounts 100 and 200, such as the inner notches 205, recessed portions 204, inner protrusions 203, outer notches 102 or 202, and outer protrusions 201 can be formed in a second step by material removal. Material removal methods can include milling, water jet cutting, laser engraving, or mount material may be cut out with a scalpel.

Additional retention components comprising pins or protrusions can be added to the optical mounts 100 and 200 to affect added capture. For example, for optical mount 200 additional protrusions such as added pins extending into the recessed portion 204 that is positioned to enter notches in the optical device, or added pins extending out from the outer surface of the optical mount can be positioned to enter notches on the housing 115. Such additional retention components further restrict the movement of the optical device 210 or 210a in certain directions. This allows the optical device 210 or 210a to be more rigidly held on one end of the housing and allowed to expand along the length of the device to account for thermal excursions.

For example, the optical device can have a bar being held in a cylindrical body supported by a disclosed optical mount ring on both ends of the bar. On one side the mounting ring can include an added pin(s) or protrusion(s) in the recessed portion 204 for optical mount 200 or for optical mount 100 the protrusion 103a or 103b can be modified with a hook shape at the end that would fit into a grove or a divot on the material being mounted, that interfaces with a divot in the optical material. This effectively pins the optical material to the optical mount on one side. The other side of the optical material bar may not be attached to the optical mount so if the optical material expands or contracts in the z-direction it is free to slide in that direction while being secured on the one side.

Figure 3A:
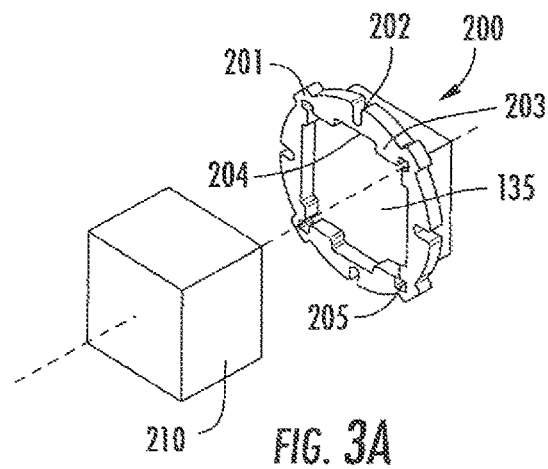
FIG. 3A shows an optical device and the disclosed optical mount shown in FIG. 2A before placement of the optical device within the optical mount, according to an example embodiment.
Figure 3B:
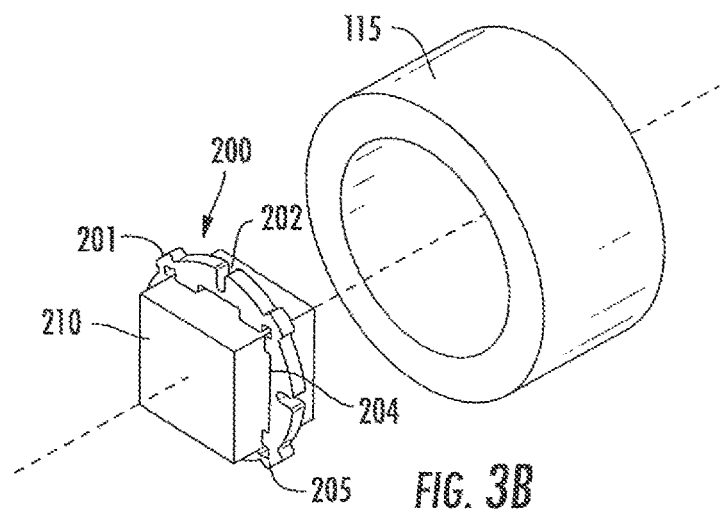
FIG. 3B shows the optical device within the disclosed optical mount shown in FIG. 2A before placement in the housing shown, according to an example embodiment.
Figure 3C:
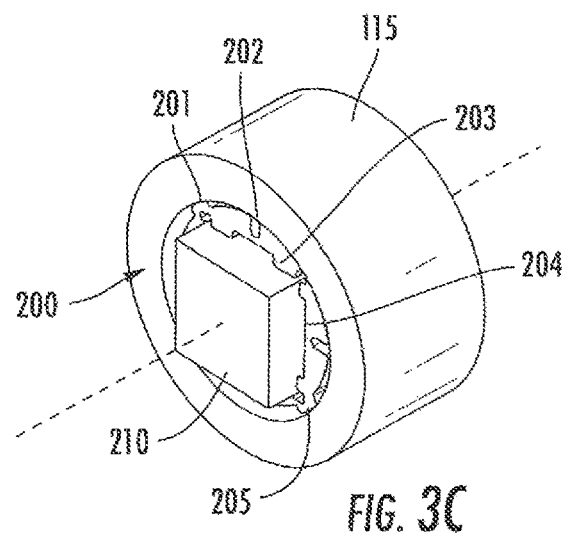
FIG. 3C shows the optical device within the disclosed optical mount shown in FIG. 2A after placement in the housing, according to an example embodiment.

FIG. 3A shows an optical device 210 and a disclosed optical mount 200 before placement of the optical device 210 within the optical mount 200, according to an example embodiment. The placement as noted above can be performed by machine or by hand. FIG. 3B shows the optical device 210 within a disclosed optical mount 200 after placement within the housing 115 shown. FIG. 3C is a view of the optical mount 200 shown in FIG. 2A having an optical device 210.

Viewing the optical mount 200 one can recognize how the optical mount 200 can be slipped over an optical device including a crystal. If distance between inner protrusions 203 on the T and B walls (thus on opposing sides) is a bit smaller than the height of the optical device 210, and the distance between inner protrusions 203 on the L and the R walls (thus on opposing sides) is also a bit smaller than the width of the optical device, the optical device 210 once inside the optical mount 200 is securely held within by these protrusions.

Disclosed optional mounts allow for a lower strain capture and centration of optical materials and subassemblies providing higher quality and performance optical products. Lower strain for the optical devices allows optical devices to be used at higher repetition rates and higher optical powers. The optical mount also makes the assembly of products easier, reducing assembly time and product fallout that both effect reduce overall cost of production.

Examples

Disclosed embodiments are further illustrated by the following specific Examples, which should not be construed as limiting the scope or content of this Disclosure in any way.

As with nearly all crystalline polarizing or polarization altering devices, Pockels cells are known to be sensitive to the angle of incidence and polarization orientation of the incoming light. This generally necessitates the angular adjustment of the Pockels cell in all three directions (pitch, yaw and roll), and maintaining of these adjustments after assembly to maintain good device performance. For Pockels cells the roll generally becomes important when the applied electric field creates fast and slow axes perpendicular to the optic axis of the crystal.

A Pockels cell with an electroded subassembly comprising an optically active crystal material with electrode plates bonded together was suspended or 'floating' within a dielectric body through which electrical connections were made. As known in the art, a Pockels cell is an electro-optic device that comprises an electro-optic crystal through which light is transmitted, where the polarization direction of the light is controlled by the voltage level applied across the electrode plates to the crystal. The optical subassembly was centered using an assembly fixture for alignment and was secured together with a low outgassing conductive adhesive by an assembly technician within an outer housing using a disclosed optical mounting ring based on the optical mount 100 or 200 described above following the sequence of assembly step shown in FIGS. 1B-D and in FIGS. 3A-3C described above.

The optical mounting ring 100 or 200 allows the Pockels cell subassembly when therein to expand and contract with temperature cycles while maintaining even contact, near constant pressure, and centration. As described above, the optical mount can be made from a plastic mount material such as PEEK that is electrically non-conductive (dielectric) which will not "wet and stick" to the surfaces of the optical subassembly. This allows the subassembly to grow and shrink in length without imparting any significant sheer strain to the subassembly or to the optical mount.

Effective Pockels cell capture was evidenced by the measurement of a stable intrinsic contrast ratio (ICR) and voltage contrast ratio (VCR). For a Pockels cell correctly aligned in pitch and yaw, ICR is roll independent. Tested Pockels cell units also displayed stable temperature cycling performance (ICR/VCR) over an extended temperature range of −20° C. to 50° C. The Pockels cell units were temperature cycled from −20 to 50° C. and then re-tested once reaching room temp. The Pockels cells were found to retain the same ICR/VCR values that they had pre-cycle. This demonstrated survivability at these temperatures. The Pockels cells units also had continuous VCR measurements performed on a pulsed laser bench for 24 hours where the temperature of the units were varied +5 to 10° C. during the experiment. The ICR/VCR were also checked in the +10° C. state with no measurable reduction in performance.

Those skilled in the art to which this Disclosure relates will appreciate that many other embodiments and variations of embodiments are possible within the scope of the claimed invention, and further additions, deletions, substitutions and modifications may be made to the described embodiments without departing from the scope of this Disclosure.

The invention claimed is:

1. An optical mount, comprising:
a mount material shaped in a closed geometry with an outer surface having sized for matching internal dimensions of an outer housing, and an inner surface comprising a plurality of spaced apart inward extending contacting features with each providing contact points that collectively define an inner opening that is sized for securing an optical device including a crystal within, and a feature gap or a recessed portion between the inward extending contacting features;
edge holders adapted for receiving corners of the optical device comprising a protrusion pair or inner notches;
the outer surface including at least one outer notch between the inward extending contacting features;
wherein the edge holders and the outer notch are for each acting as hinge points opening or pinching depending on a direction of force for the optical mount responding with flexure when there is a dimensional change in the crystal, in the mount material, or in the housing.

2. The optical mount of claim 1, wherein the inward extending features comprise the protrusion pair, and wherein protrusions in the protrusion pairs have the feature gap in between, and wherein the protrusions in the protrusion pairs each include distal ends that are angled at 80 to 100 degrees relative to one another.

3. The optical mount of claim 1, wherein the inward extending features comprise side wall surfaces, and wherein between the inward extending features there is the recessed portion.

4. The optical mount of claim 3, wherein the outer surface includes an outer protrusion over the inner notches.

5. The optical mount of claim 3, wherein there are a plurality of the outer notches that along with the inner notches are evenly spaced around a circumference of the optical mount.

6. The optical mount of claim 1, wherein the mount material comprises a polymer having an elasticity of 0.1 to 10 GPa at room temperature.

7. The optical mount of claim 6, wherein the polymer comprises a polyaryletherketone (PAEK) polymer.

8. The optical mount of claim 1, wherein the mount material is a single solid structural body.

9. A method of mounting an optical device within an outer housing, comprising:
providing an optical mount comprising a mount material shaped in a closed geometry with an outer surface sized for matching internal dimensions of the housing and an inner surface having a plurality of spaced apart inward extending contacting features with each providing contact points that collectively define an inner opening that is sized for securing the optical device that includes a crystal within, and a feature gap or a recessed portion between the inward extending contacting features, and edge holders adapted for receiving corners of the optical device comprising the protrusion pair or inner notches, wherein the outer surface includes at least one outer notch between the inward extending contacting features, and positioning the optical device within the optical mount to position the corners of the optical device in the edge holders, and positioning the optical device within the optical mount within the housing;

wherein the edge holders and the outer notch are for each acting as hinge points opening or pinching depending on a direction of force for the optical mount responding with flexure when there is a dimensional change in the crystal, in the mount material, or in the housing.

10. The method of claim 9, wherein the optical devices comprises the crystal between a pair of electrodes.

11. The method of claim 9, wherein the inward extending features comprise the protrusion pair, and wherein protrusions in the protrusion pairs have the feature gap in between, and wherein the protrusions in the protrusion pairs each include distal ends that are angled at 80 to 100 degrees relative to one another.

12. The method of claim 9, wherein the inward extending features comprise side wall surfaces, and wherein between the inward extending features there is the recessed portion.

13. The method of claim 12, wherein the outer surface includes a plurality of outer protrusions and a plurality of the outer notches between the plurality of outer protrusions.

14. The method of claim 13, wherein the plurality of outer notches and the inner notches are evenly spaced around a circumference of the optical mount.

15. The method of claim 9, wherein the outer surface further comprises outer protrusions over the inner notches.

16. The method of claim 9, wherein the mount material comprises a polymer having an elasticity of 0.1 to 10 GPa at room temperature.

17. The method of claim 16, wherein the polymer comprises a polyaryletherketone (PAEK) polymer.

18. The method of claim 9, wherein the closed geometry comprises a ring-shape and wherein the inner surfaces define a rectangle.

19. The method of claim 9, wherein the mount material is a single solid structural body.

* * * * *